United States Patent [19]

Deal et al.

[11] Patent Number: 4,717,010
[45] Date of Patent: Jan. 5, 1988

[54] CIGARETTE PACK ACCUMULATOR ASSEMBLY

[75] Inventors: Philip A. Deal, Winston-Salem; Gerard E. Leonard, Kernersville, both of N.C.

[73] Assignee: R. J. Reynolds Tobacco Company, Winston-Salem, N.C.

[21] Appl. No.: 856,309

[22] Filed: Apr. 28, 1986

[51] Int. Cl.$^4$ .............................................. B65G 47/52
[52] U.S. Cl. ........................................ 198/347; 74/56;
74/568 R; 74/569; 414/37
[58] Field of Search ................ 198/347; 414/37, 47, 414/98; 74/56, 568 R, 569, 838

[56] References Cited

U.S. PATENT DOCUMENTS

| | | | |
|---|---|---|---|
| 2,879,991 | 3/1959 | Pitner | 198/422 X |
| 3,782,523 | 1/1974 | Giatti | 198/347 |
| 4,056,916 | 11/1977 | Seragnoli | 198/347 |
| 4,560,057 | 12/1985 | Applegate et al. | 198/347 |

FOREIGN PATENT DOCUMENTS

2103627  8/1971  Fed. Rep. of Germany ...... 198/461

Primary Examiner—Frank E. Werner
Assistant Examiner—Janice Krizek
Attorney, Agent, or Firm—Grover M. Myers

[57] ABSTRACT

A cigarette pack accumulator assembly utilizes a rotating pack accumulating drum having a plurality of cigarette pack accumulating columns equally spaced about its periphery. Each such column guides a pack support pedestal for movement either downwardly during pack accumulation, or upwardly during pack discharge. A lead screw is rotatably supported within the accumulator drum and can be driven at varying speeds and directions to either raise or lower the pack support pedestals. Packs of cigarettes may be removed from a production line and accumulated, they may be stored, or they may be removed from the accumulating columns and returned to the production line.

15 Claims, 6 Drawing Figures

CIGARETTE PACK ACCUMULATOR ASSEMBLY

FIELD OF THE INVENTION

The present invention is directed generally to a cigarette pack accumulator assembly. More particularly, the present invention is directed to a cigarette pack accumulator utilizing a rotating accumulating drum. Most specifically, the present invention is directed to a rotating drum cigarette pack accumulator having a plurality of vertical cigarette pack storage columns. As the packs of cigarettes are either fed to, or removed from the cigarette pack accumulator of the present invention, the rotating drum positions one of the vertical cigarette pack retaining columns beneath a rotating vacuum transfer wheel. Cigarette package stack support pedestals are slideable vertically in each column and are either raised or lowered within the rotating accumulator drum, depending on whether the accumulator is operating in the discharge or accumulation mode. The numbers of columns formed about the periphery of the accumulating drum is an odd number and packs are fed to, or taken away from the columns in a staggered manner.

DESCRIPTION OF THE PRIOR ART

In the manufacture and packaging of cigarettes, several separate machines are used to accomplish the task of assembling various component items to make the individual packs of cigarettes and to form these packs into cartons. Initially a machine, usually identified as a packer, is used to group a specific number of cigarettes together and to wrap this group in an inner liner, outside label, and closure stamp. This product from the packer is then transferred by suitable means to a wrapper or wrapping machine where the pack is wrapped with a clear cellophane type overwrap having a tear strip. The packed and wrapped cigarette pack is then advanced along suitable conveying means to a cartoner. At the cartoner, a group of packs are assembled and are placed in a pliable cardboard blank which is folded along previously formed score lines to fold into a cigarette carton.

In a typical manufacturing plant environment the packer, wrapper and cartoner operate independently of each other. Each machine performs its intended function on the incoming product and sends it on to the next machine. In an ideal situation the production rates of the three machines would be coordinated so that each machine would work in concert with the other two. Thus the packer and wrapper would process packs at just the right speed for the cartoner to handle.

It is obvious that the above described scenario is not possible in an actual production setting. Machines are subject to breakdown, machine stoppage and other unpredictable failures. If one machine in the series is not functioning properly, the others in the series are adversely affected. The still operating machines either experience a work backup if the fault is downstream, or a work depletion, if the fault is upstream.

The need in the cigarette manufacturing industry has long existed for a cigarette pack storage assembly which could accumulate and store packs of cigarettes in case of a downstream machine failure, yet which could discharge previously stored cigarette packs in case of an upstream machine failure. Such a cigarette pack storage assembly, or accumulator, would be positioned between the packer and wrapper, with a second similar machine placed between the wrapper and the cartoner. Thus, for example, an accumulator positioned between the packer and wrapper could receive and store products from the packer if the wrapper were not operating, and could discharge and feed products to the wrapper if the packer were not functioning properly.

While the need for such a cigarette pack storage or accumulator is of long standing in the cigarette packaging industry, the presently available devices have not been totally satisfactory. The traditional accumulator picks up groups of packs, assembled in rows, and elevates these rows above the conveying means which extends between the several machines. This is accomplished by placing a pair of wide, endless conveying belts spaced from each other by approximately the width or thickness of a cigarette pack, above the conveying means that extends between the several production machines, such as the packer and wrapper. A row of cigarette packs, as long as the width of the spaced belts can then be grasped by the spaced belts, and elevated. Multiple rows of cigarette packs can, in this manner, be picked off the conveying means and raised up into the space above the production line.

In presently known accumulators of this type, the packs are stored in rows above the production line. The more capacity provided by the accumulator, the greater the head space required. In many plant facilities, the capacity of the accumulator is dictated by ceiling height. These machines require a relatively large amount of space to accumulate a relatively small number of packs.

Machines of this type must grasp and hold packs of cigarettes in rows and they can only return packs of cigarettes into the stream of production in the same row configuration. This type of pack return is not particularly easily accomplished and makes it difficult to smoothly reintroduce stored packs.

It will thus be apparent that there is a need for a cigarette pack storage or accumulation device which can receive, store or hold, and discharge or reintroduce cigarette packs in a production facility. The presently available accumulating devices have substantial space requirements and do not provide flexibility of storage and discharge rates. In contrast, the cigarette pack accumulator in accordance with the present invention, as will be discussed subsequently, requires substantially less space than the prior art devices and is much more flexible in operation, thereby being readily adaptable to numerous production situations.

SUMMARY OF THE INVENTION

It is an object of the present invention to provide a cigarette pack accumulator.

Another object of the present invention is to provide a cigarette pack accumulator which utilizes a rotating accumulating drum.

A further object of the present invention is to provide a cigarette pack accumulator having a plurality of storage columns formed on the rotating storage drum.

Still another object of the present invention is to provide a cigarette pack accumulator having a plurality of vertically movable cigarette pack support pedestals.

Yet a further object of the present invention is to provide a cigarette pack accumulator which receives or discharges cigarette packs individually.

Even still another object of the present invention is to provide a cigarette pack accumulator having a lead screw and sloped support pedestal driving cups.

Still yet a further object of the present invention is to provide a cigarette pack accumulator which has a high storage to space requirement ratio.

As will be discussed in greater detail in the description of the preferred embodiment which is set forth subsequently, the cigarette pack accumulator in accordance with the present invention is comprised generally of a rotatable, generally cylindrical accumulating drum. A plurality of vertical cigarette pack receiving columns are formed on the surface of this accumulating drum or housing. Each such support column carries a cigarette pack support pedestal that is caused to move either upwardly or downwardly by one of two relatively operable inclined support plates carried for vertical movement by a lead screw within the accumulating drum.

The accumulating support drum is continually rotating about a central vertical axis in one direction, and at a constant speed regardless of whether it is in an accumulation mode, a storage mode, or a discharge mode. Selection of the appropriately shaped inclined support plate and of the speed and direction of the lead screw determine whether packs of cigarettes are being accumulated, stored or discharged.

The cigarette pack accumulator in accordance with the present invention is capable of being placed beneath a production facility and further does not require a great deal of head space as do the various prior art devices. A transfer wheel which may use vacuum ports to grip cigarette packs individually is placed beneath the pack conveying means and feeds the individual packs to the various storage columns. Packs can thus be individually removed from, or returned to the production line to provide significantly better flexibility of operation in comparison with prior art devices.

An odd number of storage columns are formed about the perimeter of the cylindrical storage drum. The support pedestals carried in successive ones of the support columns are of one of two heights. Thus, the height of the top surfaces of the pack in successive ones of the columns is different from one support column to the next. The pack height variations is selected in concert with drum rotation speed so that every other column either receives or discharges a pack. The accumulation or discharge of packs from alternating columns gives rise to the requirement for an odd number of support columns.

In view of the manner in which individual packs are deposited on or removed from the accumulator drum, it is important that suitable means be employed to monitor the storage locations of all packs accumulated. For example, an accumulator drum that is provided with a total of seven support columns numbered consecutively would accumulate packs by positioning each column adjacent to the transfer wheel in the sequence 1, 3, 5, 7, 2, 4, 6, 1 etc. A programmable controller or computer may be used to record the location of each accumulated pack so that the next pack to be accumulated will be directed to the support column that is next in the sequence. Conversely, the removal of packs in the discharge mode would require positioning of each column in the reverse sequence (i.e., 6, 4, 2, 7, 5, 3, 1, 6 etc.) so that the last pack deposited on the accumulator drum would be the first one removed. It is necessary to employ suitable means to identify each support column on the accumulator drum to enable the programmable controller or computer to monitor and to control the movement of individual packs to and from the accumulator drum. Thus, the controller or computer must respond to appropriate signals from the main production line calling for accumulation, holding or discharge of cigarette packs and, in turn, must activate appropriate control devices to coordinate the deposit or removal of packs to and from the appropriate support columns on the accumulator drum.

The cigarette pack accumulator assembly in accordance with the present invention is much more space efficient than are the prior art devices. In addition, much greater flexibility in pack reception and discharge is provided. The subject pack accumulator is a substantial advancement in the art and provides an accumulating device well suited to various production requirements.

BRIEF DESCRIPTION OF THE DRAWINGS

While the novel features of the cigarette pack accumulating assembly in accordance with the present invention are set forth with particularity in the appended claims, a full and complete understanding of the invention may be had with reference to the description of the preferred embodiment, as is set forth hereinafter, and as is illustrated in the accompanying drawings in which:

DESCRIPTION OF THE PREFERRED EMBODIMENT

Figure 1:
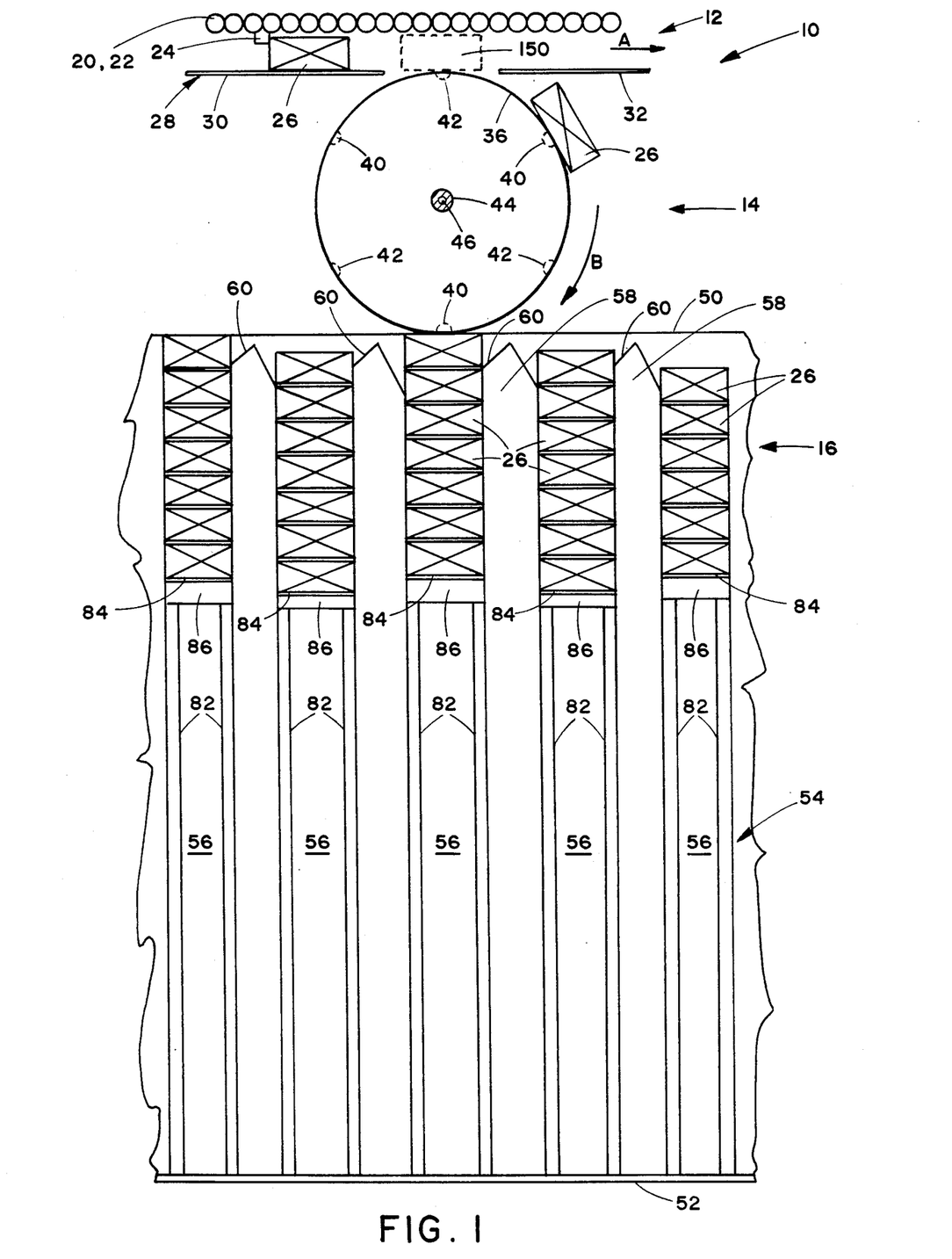
FIG. 1 is a schematic side elevation view, with portions removed for clarity, of a cigarette pack accumulator assembly in accordance with the present invention.

Turning initially to FIG. 1, there may be seen generally at 10 a preferred embodiment of a cigarette pack accumulator assembly in accordance with the present invention. Pack accumulator assembly 10 is positioned adjacent to and below a cigarette pack conveying means, which is indicated generally at 12. Pack accumulator assembly 10 is comprised generally of a cylindrical, rotary accumulating drum, indicated at 16. While cigarette pack accumulator assembly 10 will be discussed hereinafter for use with packs of cigarettes, it will be apparent that its usage is not limited solely thereto. Any number of articles of generally similar shape and configuration which are being handled or treated in two separate locations can be accumulated, stored and discharged by the accumulating assembly 10 of the present invention.

Figure 2:
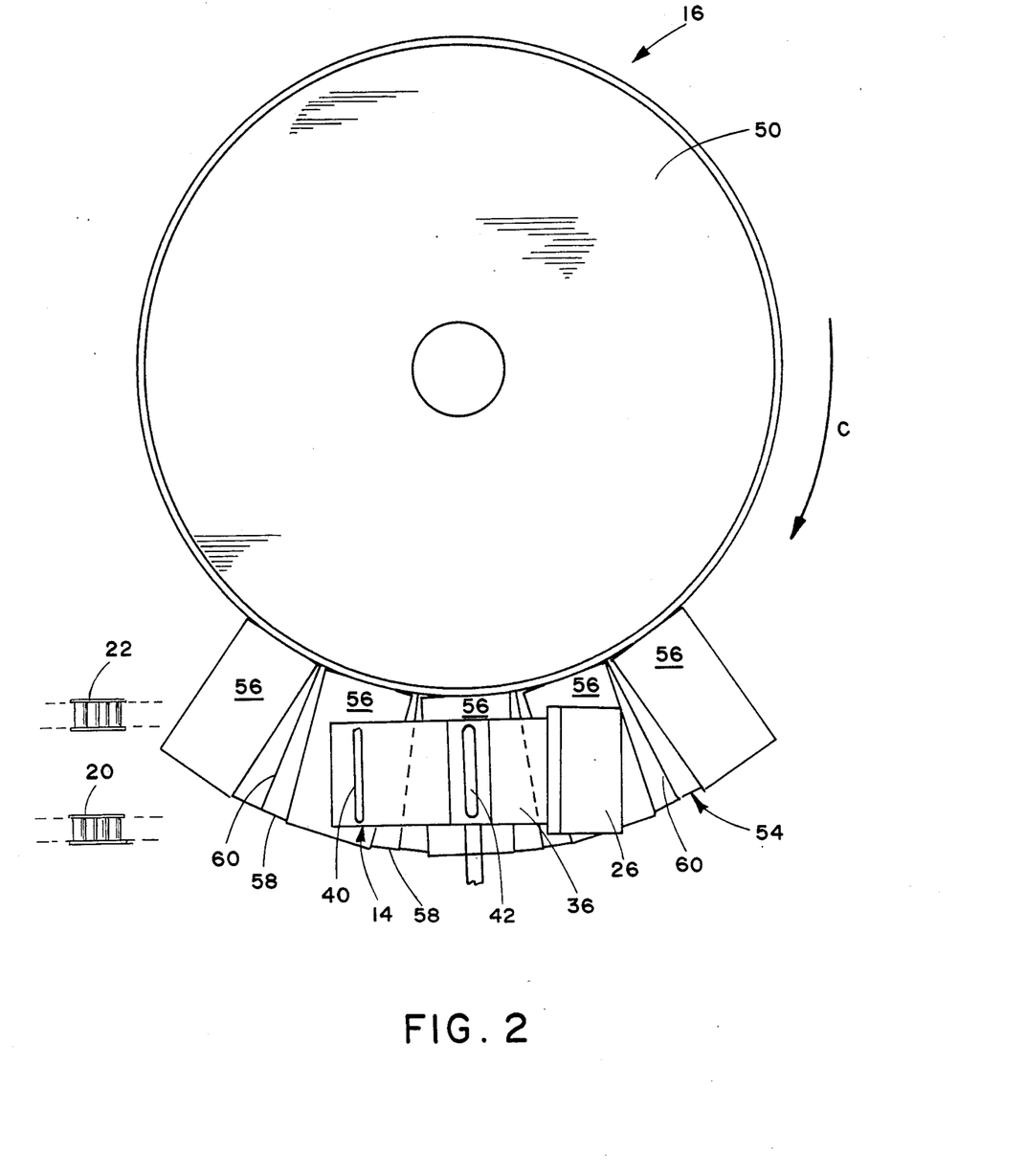
FIG. 2 is a top plan view, again in somewhat schematic form, of the cigarette pack accumulator.

Cigarette pack conveying means, generally 12, is comprised of a pair of spaced, overhead lugged chains 20, 22, as may also be seen in FIG. 2. Each chain carries spaced, downwardly directed spotting lugs 24 which push and slide spaced packs of cigarettes 26 along spaced support rails generally at 28. Such an arrangement is generally well known in the art. It will be understood that packs 26 are being urged along spaced support rails generally at 28 by spaced lugged chains 20, 22 from left to right in the direction of arrow A, as seen in FIG. 1.

Directly above rotating vacuum transfer wheel 14 there is provided a gap in pack support rails 28. This gap separates the rails into an upstream set of support rails 30 and a downstream set of support rails 32. During normal production line operation when accumulator 10 is not being used, the lugged chains 20, 22 advance packs of cigarettes 26 along upstream support rails 30, over upper peripheral surface rails 32. During operation of cigarette pack accumulator 10, these support rail pairs 30 can be spread or pivoted horizontally apart by suitable pneumatic or hydraulic means (not shown) so that packs of cigarettes can be handled by transfer wheel 14 without rail interference. When transfer wheel 14 is operating in an accumulatory mode to feed packs to accumulator drum 16, the downstream rails 32 split apart slightly. If the transfer wheel 14 is discharging packs from accumulator drum 16 to the pack conveying 12, it is the upstream rails 30 which split apart slightly.

Vacuum transfer wheel 14 is, as may be seen in FIGS. 1 and 2, a cylinder having a width slightly less than that of the spaced lugged chains 20, 22, and having a plurality of alternating spaced accumulation and discharge vacuum ports 40 and 42 positioned on peripheral surface 36. It will be understood that vacuum transfer wheel 14 is supported for rotation in a clockwise direction, as viewed in FIG. 1, about a generally horizontal central transfer wheel support shaft 44 which is provided with a central longitudinal bore 46 that is connected to a vacuum source and is in communication with vacuum ports 40 and 42. Suitable conventional means may be provided to actuate either the accumulation vacuum port 40, or the discharge port 42, depending on the mode of operation of cigarette pack accumulating assembly 10. The alternating accumulation and discharge ports 40 and 42 on the periphery 36 of vacuum transfer wheel 14, the overall diameter of wheel 14, and its speed of rotation are all selected in accordance with the size of accumulator drum 16 so that the packs 26 being handled by vacuum transfer wheel 14 will be properly spaced upon arrival at accumulator drum 16. The use of alternating accumulation and discharge ports on transfer wheel 14 permits individual packs to be accumulated and discharged without interruption to the main flow of packs 26. Also, the circumference of transfer wheel 14 and the pitch between lugs 24 are complementary.

Referring again to FIG. 1, as well as FIG. 2, accumulator drum 16 is generally in the shape of an upright cylinder having a top 50, a bottom 52 and a generally vertical sidewall 54. Sidewall 54 of accumulator drum 16 is formed with a plurality of evenly spaced pack accumulating slots or columns 56. Due to the structure and operation of the pack accumulator 10 there are provided an odd number of these pack receiving slots or columns 56 in the sidewall 54 of accumulator drum 16. Each column 56 is separated from adjacent similar columns by a divider 58. Each such divider 58 is formed with a generally wedge-shaped upper surface portion 60. This wedge-shaped upper portion 60 assists and directs the various cigarette packs 26 as they are deposited in the columns 56 of accumulator drum 16 by the vacuum transfer wheel 14. If one of the packs is not exactly aligned in its correct pack receiving slot 56, the wedge-shaped upper portions 60 of adjacent dividers 58 will guide it into place.

As is shown in FIG. 2, the accumulator drum 16 is positioned beneath the vacuum transfer wheel 14 so that the various accumulating and discharging vacuum ports 40 and 42 on the periphery 36 of vacuum transfer wheel 14 will overlie the cigarette pack receiving slots or columns 56 in accumulator drum 16. As packs 26 are moved along the upstream set of support rails 30, they are picked up by the accumulating vacuum ports 40 on vacuum transfer wheel 14 and are moved in a downward clockwise direction, as indicated by arrow B in FIG. 1 until they overlie the appropriate pack receiving column 56. At this point, the vacuum is released allowing the pack to be deposited in the support column 56. As indicated by arrow C in FIG. 2, accumulator drum 16 also revolves or rotates in a clockwise manner generally about a vertical axis which is generally perpendicular to, and intersects the axis of rotation of the vacuum transfer wheel 14. Accumulator drum 16 rotates in this clockwise manner at a constant speed during all three modes of operation, i.e. accumulation, storage, or discharge. No specific drive means is shown for accumulator drum 16 but it will be evident that a number of drive means could be provided. For example, the bottom 52 of drum 16 could be provided with peripheral gear teeth that could cooperate with a drive gear carried by a speed controllable electric motor. In this way, the speed of rotation of the accumulator drum 16 and of the vacuum transfer wheel can be controlled in a cooperating manner.

Figure 3:
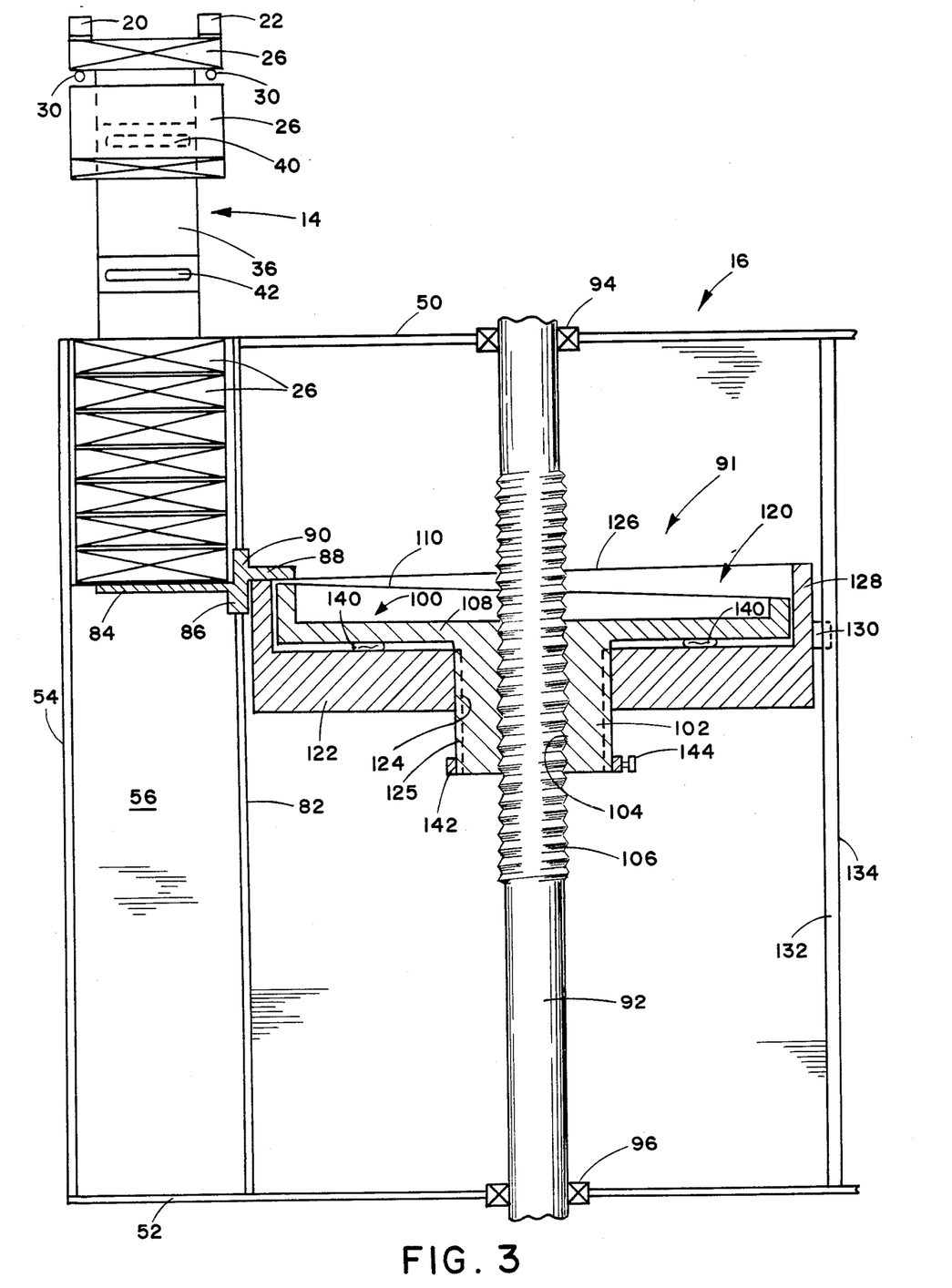
FIG. 3 is a side elevation view, partly in section, of the cigarette pack accumulator and showing the inclined support plates and lead screw.
Figure 4:
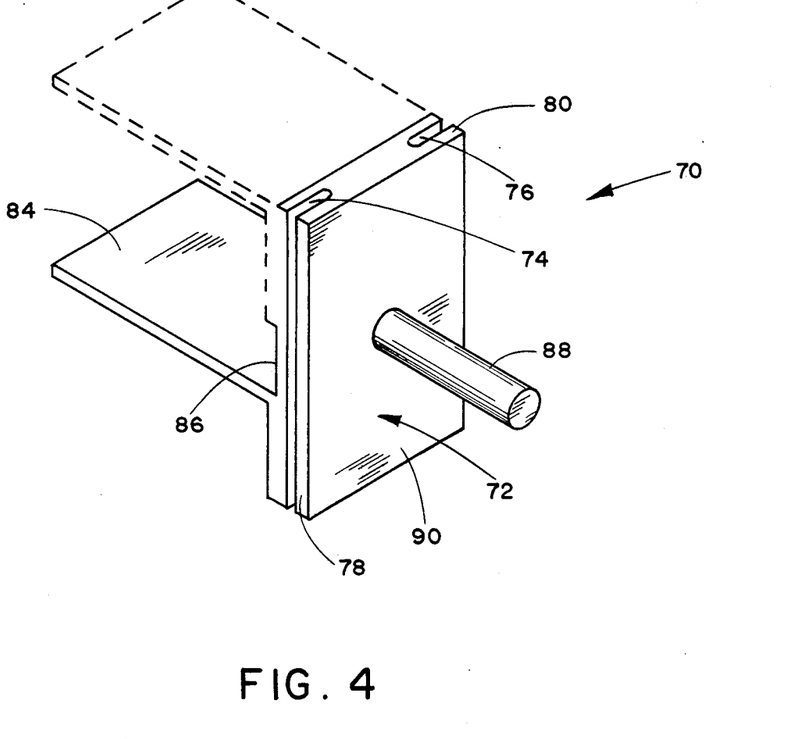
FIG. 4 is a perspective view of a cigarette stack support pedestal that is used in the cigarette pack accumulator assembly.

A cigarette stack support pedestal, which may be seen generally at 70 in FIG. 4, is slideably positioned within each of the cigarette pack receiving slots or columns 56. Each pack support pedestal 70 is formed having a generally thin rectangular body 72 which includes pedestal slide grooves 74 and 76 formed on spaced vertical edge portions 78 and 80, respectively, of the pedestal slide body. These slide grooves accommodate protruding tongues 82 which, as may be seen in FIGS. 1 and 3, are formed in the rear of the cigarette pack receiving slots or columns 56. A forwardly projecting, generally horizontal, cigarette pack support platform 84 is formed on a front face of pedestal body 72. This platform 84 may be formed as a low platform, as shown in solid lines in FIG. 4, or may be formed as a high platform as seen in phantom lines in FIG. 4. The need and use for both of these alternate pack support pedestals 70 will be discussed in detail shortly. A pedestal drive member in the form of an elongated rod 88 extends rearwardly from a rear or inner face 90 of pedestal body 72. The cigarette pack pedestal 70 is preferably molded from a long wearing, light weight material so that it will slide easily and will not wear rapidly.

As packs of cigarettes are removed from upstream support rails 30 by vacuum transfer wheel 14 and are placed into the various pack receiving support columns 56 on accumulating drum 16, the various cigarette pack support pedestals 70 must move vertically downwardly in the support columns 56. When the cigarette pack accumulator is operating in a storage mode, the position of the support pedestals 70 in the pack support columns or slots 56 does not change. In the pack discharge mode, the support pedestals 70 must be caused to move vertically upwardly in the pack support slots 56. These several directions of movement are accomplished by a support pedestal drive means which is shown generally at 91 in FIG. 3. A lead screw 92 is positioned coextensively with the vertical axis of rotation of accumulator drum 16. This lead screw 92 is rotatably supported by suitable bearings 94 and 96 secured in the top and bottom plates 50 and 52, respectively, of accumulator drum 16. Although not specifically shown, it will be understood that lead screw 92 is driven by a suitable drive motor whose speed and direction of rotation are both able to be closely regulated.

An inner pedestal support cup 100 has a central hub 102 provided with a central threaded bore 104 which cooperates with threads 106 on lead screw 92. As may be seen in FIG. 3, the threads 106 on lead screw 92 have a pitch and hand so that rotation of lead screw 92 in a clockwise direction as viewed from above (i.e., in the same direction as the rotation of the accumulator drum 16) causes the inner pedestal cup to move upwardly. Inner pedestal support cup 100 has a generally planar base 108 which terminates in an upstanding sloped discharge rim 110. This inner pedestal support cup is used during the discharge mode as will be discussed shortly.

A concentric outer pedestal support cup 120 has a generally planar base 122 which is provided with a central splined bore 124 that is slidable along outer spline 125 formed on the outer surface of hub 102. Thus, outer support cup 120 is able to move in a telescopic manner with respect to inner cup 100. Outer pedestal support cup 120 is also formed with an upstanding sloped accumulating rim 126. As with the inner discharge rim 110, the function of this rim will be discussed shortly. A sidewall portion 128 of outer accumulating rim 126 is provided with one or more keys 130 that are received in cooperating key slots 132 formed on the inner wall surfaces 134 of accumulator drum 16. Thus the concentric inner and outer pedestal support cups 100 and 120, respectively, are rotatable with accumulator drum 16 in the same direction and at the same speed as drum 16. It will be understood that key 130 and slot 132 are merely exemplary of any number of means which could be used to cause drum 16 and the inner and outer support cups 100 and 120 to rotate together. Various other means such as pins and sockets or the like could be used.

Suitable means such as an annular inflatable diaphragm or pancake pneumatic cylinders 140 or the like are located between the base 108 of inner pedestal support cup 100 and the base of outer pedestal support cup 120. These pancake cylinders are operable to slide outer support cup 120 vertically with respect to inner support cup 100 through the cooperation of splined bore 124 and outer hub splines 125. Vertical movement of outer pedestal support cup 120 along the hub of inner pedestal support cup 100 is limited by the length of pancake cylinder 140. A collar 142 may also be secured to the lower portion of inner pedestal support cup hub 102 by means of a suitable set screw 144 or similar fastener.

Figure 5:
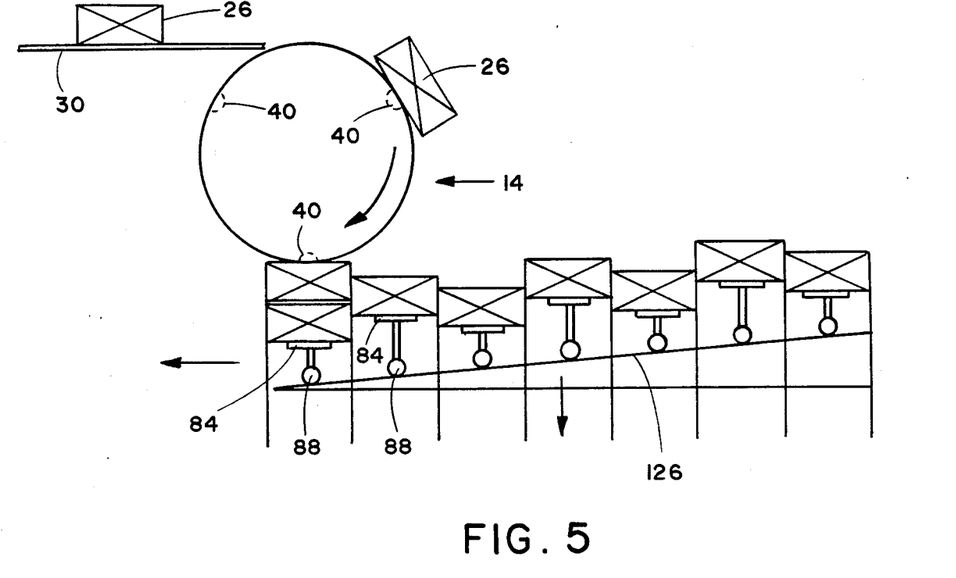
FIG. 5 is a schematic representation of the cigarette pack accumulator in operation receiving packs of cigarettes.

The configuration of the cigarette pack accumulator 10, shown in FIG. 3 is appropriate for an accumulation mode which is also somewhat schematically depicted in FIG. 5. It will be understood in FIGS. 5 and 6 that the inclined rims 126 and 110 of the pedestal support cups have been shown in a somewhat schematic manner since these rims are actually circular and not flat. During the accumulation mode, the lead screw 92 is driven in the opposite direction of rotation as is the accumulator drum and at a speed sufficient to displace rim 126 downwardly one pack height for each two revolutions of accumulator drum 16. The several pedestal drive members 88, which are part of the individual cigarette pack support pedestals 70, are supported by the upper surface of the accumulating rim 126 of the outer pedestal support cup 120. As this cup moves vertically downwardly, the various cigarette pack support pedestals 70 also move down, as seen schematically in FIG. 5. Thus, incoming cigarette packs 26 are removed from the upstream support rails 30 by the accumulation vacuum ports 40 on vacuum transfer wheel 14. It will be recalled that the downstream support rails 32 will split in the accumulator mode to allow the packs being accumulated to pass therethrough. Since the shape of the inclined rim 126 of the accumulating pedestal support cup is uniformly inclined, it is necessary to use alternating high and low support pedestals 70, as may be seen in FIG. 5, and to coordinate the accumulating and discharging ports of the vacuum transfer wheel 14 with the accumulating drum 6 so that packs 26 being accumulated will be delivered to alternate ones of the cigarette pack support columns 6. This dictates that the number of support columns 6 placed about the periphery of the accumulating drum 16 must be an odd number. Thus, each stack or column receives a pack of cigarettes once every two revolutions of the accumulating drum 16.

During operation of the accumulator drum 16 in the storage mode, the speed of rotation of lead screw 92 is in the same direction and at the same speed as accumulator drum 16. This means that there is no relative motion between lead screw 92 and inner support cup hub 102. Accordingly, the cigarette pack support pedestals do not move vertically in their slots. The accumulator drum is initially in an idling or standby configuration so that it can be used either to accumulate or discharge packs of cigarettes as the need arises.

When the cigarette pack accumulating assembly 10 is to be operated in the discharge mode, several changes are made. The speed and direction of rotation of accumulator drum 16 remains the same as in prior operating modes, as does the speed and direction of rotation of the vacuum transfer wheel 14. However, the inflatable pancake cylinders 140 are actuated to cause the outer pedestal support cup 120 to move downwardly along the hub 102 of the inner support cup. Support of the pedestal drive members 88 is now transferred to the oppositely sloped discharge rim 110 of the inner pedestal support cup. During this change of support, the various pack support pedestals 70 are not caused to move upwardly so that packs of cigarettes are not pushed out of the support columns 56. Once pedestal support has been transferred to the inner pedestal support cup's discharge rim 110, the direction and speed of lead screw 92 are changed. In the discharge mode, lead screw 92 is caused to rotate in the same direction as that of the accumulating drum and at a speed selected to displace the rim 110 upwardly one pack height for each two revolutions of the accumulator drum. As may be seen in FIG. 6, this movement causes all of the cigarette pack support pedestals 70 to slide upwardly in their respective support columns. Vacuum transfer wheel 14 continues to rotate in a clockwise direction but now the discharge vacuum ports 42 are supplied with vacuum and packs of cigarettes 150 are picked up from the tops of the support columns, and are placed on the downstream support rails 32. In this discharge mode, it is the upstream support rails which periodically split open to allow the packs 150 carried by the vacuum transfer wheel to pass through. As with the operation in the accumulation mode, due to the slope of the discharge rim, it is necessary for accumulator drum 16 to make two complete revolutions to discharge one pack from each stack.

Figure 6:
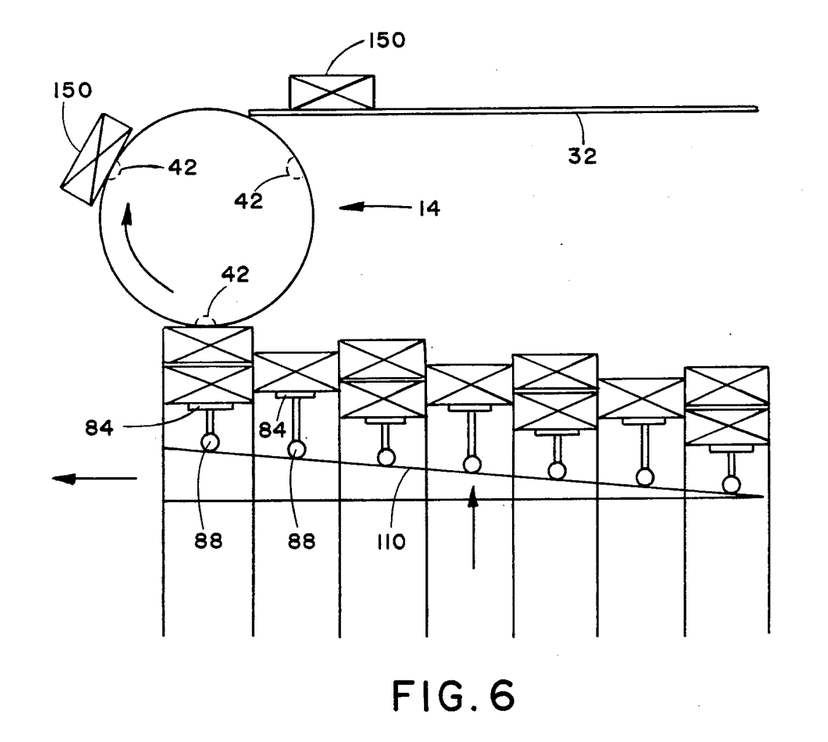
FIG. 6 is a schematic view similar to FIG. 5 but instead illustrating the cigarette pack accumulator in the discharging mode.

Further, the low and high pack support pedestals 70 are staggered, as may be seen in FIG. 6.

The various control means necessary to properly operate the cigarette pack accumulating device 10 of the present invention have not been specifically disclosed or discussed. Suitable control means can be provided to synchronize accumulation and discharge rates at pack accumulating device 10 with production rates at the packer and wrapper. This synchronization will also allow packs of cigarettes 150 returned to the production line to be interspersed with packs traveling along the line. This is illustrated in FIG. 1. Various controls may also be provided to coordinate the operation of the inflatable pancake pneumatic cylinders 140 or similar separating means for the inner and outer pedestal support cups 100 and 120, respectively, so that the proper pedestal support cup will be activated depending on whether accumulating rim 126 or discharge rim 110 is to support the pedestal drive members 88.

The capacity of the cigarette pack accumulating assembly 10 in accordance with the present invention depends on the height and circumference of the accumulator drum 16. For example, a drum 16 having a diameter of 24 inches with 21 columns and a height of approximately 16½ inches could accommodate about 400 packs of cigarettes. Similarly, a drum having a height of 21½ inches could carry about 525 packs of cigarettes. In contrast, it would require between about 35 and 135 linear feet to store 500 packs of cigarettes in a line, depending on pack orientation, i.e., side by side or end to end. Clearly, the cigarette pack accumulator assembly 10 of the present invention is significantly more space effective than the various prior art devices. It is readily adaptable to numerous production capacity requirements and can function in numerous manufacturing situations.

While a preferred embodiment of a cigarette pack accumulator assembly in accordance with the present invention has been fully and completely set forth hereinabove, it will be obvious to one of skill in the art that a number of changes in, for example, the size of the accumulator drum, the pack gripping means employed by the transfer drum, the various drive and control means, the materials used for the drum and components and the like could be made without departing from the true scope and spirit of the present invention which is accordingly to be limited only by the following claims.

We claim:

1. A cigarette pack accumulator assembly for receiving and discharging packs of cigarettes traveling along a cigarette pack conveying means, said cigarette pack accumulating assembly comprising
    (a) a rotatable cigarette pack accumulating drum having a plurality of spaced pack support columns and being rotatable about a generally vertical axis of rotation;
    (b) a cigarette pack support pedestal movably carried within each pack support column;
    (c) means carried by said pack accumulating drum to move said support pedestals collectively within said support columns and including:
        (i) a rotatable lead screw mounted in said cigarette pack accumulating drum and rotatable with respect to the drum,
        (ii) spaced concentric inner and outer pedestal support cups with each of said cups having a base and an upstanding rim, the inner pedestal support cup base having a central hub with a central threaded bore for receiving said rotatable lead screw and the outer pedestal support cup base having a central splined bore that is slidably positioned about an outer splined portion of the central hub of said inner pedestal support cup and
        (iii) means for moving said inner pedestal support cup in a telescopic manner with respect to said outer pedestal support cup; and
    (d) means for transferring said packs of cigarettes between said cigarette pack conveying means and said cigarette pack accumulating drum.

2. The cigarette pack accumulator assembly of claim 1 wherein said cigarette pack accumulating drum is generally in the form of a cylinder rotatable about said generally vertical axis of rotation.

3. The cigarette pack accumulator assembly of claim 1 wherein said cigarette pack accumulating drum carries an uneven number of said pack support columns.

4. The cigarette pack accumulator assembly of claim 1 wherein each of said pack support columns is separated from adjacent ones of said pack support columns by a divider.

5. The cigarette pack accumulated assembly of claim 4 wherein each of said dividers terminates at an upper end portion and a beveled top.

6. The cigarette pack accumulator assembly of claim 1 wherein each said cigarette pack support pedestal includes a generally planar body.

7. The cigarette pack accumulator assembly of claim 6 wherein a cigarette pack support platform is formed on a first face of said planar body of said support pedestal.

8. The cigarette pack accumulator assembly of claim 7 wherein a pedestal drive means is provided on a second face of said planar body of said support pedestal.

9. The cigarette pack accumulator assembly of claim 6 wherein said support pedestal includes pedestal slide grooves in vertical edge portions of said planar body, said pedestal slide grooves being in cooperation with tongues formed in rear wall portions of said support columns.

10. The cigarette pack accumulator assembly of claim 1 wherein said rims of said inner and outer pedestal support cups selectively support said support pedestals and move said support pedestals upon rotation of said lead screw.

11. The cigarette pack accumulator assembly of claim 1 wherein one of said pedestal support cups is rotatably driven by said rotatable accumulating drum.

12. The cigarette pack accumulator assembly of claim 11 wherein said outer pedestal support cup is keyed to said accumulator drum.

13. The cigarette pack accumulator assembly of claim 1 wherein said means for transferring said packs of cigarettes between said conveying means and said accumulating drum is a rotatable vaccum transfer wheel.

14. The cigarette pack accumulator assembly of claim 13 wherein said vacuum transfer wheel includes spaced, alternating pack accumulating ports and pack discharging ports.

15. The cigarette pack accumulator assembly of claim 1 wherein said means for transferring packs of cigarettes between said cigarette pack conveying means and said cigarette pack accumulating drum includes means for receiving or discharging individual packs of cigarettes in response to a control signal.

* * * * *